Patented Nov. 7, 1939

2,178,608

UNITED STATES PATENT OFFICE 2,178,608

ALKYL GUAIACOLS

Roland R. Read, Kirkwood, Mo., assignor to Sharp & Dohme, Incorporated, Philadelphia, Pa., a corporation of Maryland No Drawing. Original application October 10, 1932, Serial No. 637,199. Divided and this application April 17, 1937, Serial No. 137,479

4 Claims. (Cl. 260—613)

This application relates to new alkyl guaiacols. It is a division of my prior application Serial No. 637,199, filed October 10, 1932.

In my said prior application, I described an advantageous process for the production of alkyl phenols, which briefly consists in condensing alcohols with phenols in the presence of an acid solution of a condensing agent, e. g., a solution of zinc chloride in hydrochloric acid. I also described a number of important new alkyl phenols, including the new alkyl guaiacols claimed in this application.

These new alkyl guaiacols include secondary butyl guaiacol, secondary amyl guaiacol, secondary hexyl guaiacol, tertiary hexyl guaiacol and cyclohexyl guaiacol.

The production of these new products will be illustrated by the following example, relating to the production of tertiary hexyl guaiacol, but the invention is not limited to the use of the process described. This process, which has important advantages, is claimed in my said prior application.

Example.—62 parts of guaiacol and 45 parts of zinc chloride are heated together until solution occurs. 10 parts of concentrated hydrochloric acid in 46 parts of tertiary hexyl alcohol (dimethyl-n-propyl carbinol) are added in several portions while the temperature is held at 100–130° C. The resulting oil is purified by dissolving in twice its volume of benzene and extracting with several portions of dilute sodium hydroxide. The alkaline extracts are combined, acidified and the recovered phenolic material distilled. The product which distills over between 275 and 290° C. is collected as tertiary hexyl guaiacol. It is a new product.

The reaction employing zinc chloride as a condensing agent in the presence of an acid may be applied generally to the condensation of alcohols with guaiacols. In this manner, the following new compounds have been prepared:

Secondary butyl guaiacol, boiling around 245–270° C.

Secondary amyl guaiacol, boiling around 250–268° C.

Secondary hexyl guaiacol, boiling around 255–275° C.

Cyclohexyl guaiacol, boiling around 300–308° C.

The new alkyl guaiacols are active germicides varying considerably in activity, but in general having high phenol coefficients. They have a wide field of usefulness.

I claim:

1. As new compounds alkyl guaiacols from the group consisting of secondary butyl guaiacol, secondary amyl guaiacol, secondary hexyl guaiacol, tertiary hexyl guaiacol and cyclohexyl guaiacol.

2. Secondary hexyl guaiacol.

3. Secondary amyl guaiacol.

4. Tertiary hexyl guaiacol.

ROLAND R. READ.